United States Patent [19]

Tanaka et al.

[11] Patent Number: 4,539,895
[45] Date of Patent: Sep. 10, 1985

[54] SEALING DEVICE

[75] Inventors: Hiroshi Tanaka, Niiza; Mutuo Sugisaki, Kamifukuoka; Kazuhiro Itoh, Wako, all of Japan

[73] Assignee: Honda Giken Kogyo Kabushiki Kaisha, Tokyo, Japan

[21] Appl. No.: 425,955

[22] Filed: Sep. 28, 1982

[30] Foreign Application Priority Data

Jan. 29, 1982 [JP] Japan ................... 57-12860

[51] Int. Cl.³ .............................................. F16J 9/28
[52] U.S. Cl. ........................................ 92/249; 92/250
[58] Field of Search ............... 92/249, 250, 182, 184, 92/185, 194; 277/134, 152, 237

[56]  References Cited

U.S. PATENT DOCUMENTS

| 1,076,269 | 10/1913 | Christenson | 92/194 |
| 1,313,997 | 8/1919 | Krause | 92/194 |
| 1,750,638 | 3/1930 | Jackson | 92/194 |
| 1,773,363 | 8/1930 | Kibele | 92/185 |
| 2,004,669 | 6/1935 | Miller | 92/194 |
| 3,295,419 | 1/1967 | Vielmo et al. | 92/194 |

FOREIGN PATENT DOCUMENTS

| 504375 | 4/1939 | United Kingdom | 92/194 |
| 0504063 | 4/1939 | United Kingdom | 277/237 |

Primary Examiner—Robert E. Garrett
Assistant Examiner—John M. Husar
Attorney, Agent, or Firm—Armstrong, Nikaido, Marmelstein & Kubovcik

[57] ABSTRACT

A useful sealing device which serves to fluidtightly seal a clearance between a cylindrical member and a cylindrical bore into which said cylindrical member is to be fitted. The sealing device comprises an annular endless resilient seal ring made of a resilient sheet-like material and having an inner diameter smaller than an outer diameter of a seal fitting portion on the cylindrical member. One of the opposite surfaces of the resilient seal ring is tightly fitted around the fitting portion of the cylindrical member in a facing relation to each other, whereas the other surface of the same is faced to the sealing surface of the cylindrical bore and at least a part thereof is placed in resilient contact with the sealing surface.

2 Claims, 8 Drawing Figures

SEALING DEVICE

BACKGROUND OF THE INVENTION

1. Field of the Invention

The present invention relates to a sealing device and more particularly to an unidirectional sealing device which ensures fluid tightness between a cylindrical member and a cylindrical bore into which said cylindrical member is to be fitted.

2. Description of the Prior Art

A conventional sealing device required for sealing a clearance between a cylindrical member such as piston or the like and a cylindrical bore such as cylinder or the like is constructed such that an annular seal ring with a slit formed at a certain position therearound is fitted around an annular seal groove on the outer surface of the cylindrical member in such a manner that the seal ring comes in resilient contact with the inner wall of the cylindrical bore due to expansive force of the piston ring itself or with the aid of another resilient member. However, it is pointed out as drawbacks inherent to the conventional sealing device of the above-described type that gas or liquid may be leaked through the slit on the seal ring and furhter the conventional sealing device requires in its manufacturing process additional work such as lathing, grinding finish and the like on both the inner and outer peripheries of the seal ring, thus increasing the cost.

SUMMARY OF THE INVENTION

Thus, the present invention is intended to obviate the drawbacks of the conventional sealing device as described above.

It is a principal object of the present invention to provide a sealing device which ensures an excellent sealing effect and is manufactured at a low cost.

To accomplish the above object satisfactorily there is proposed in accordance with the present invention a sealing device for fluidtightly sealing a clearance between a cylindrical member and a cylindrical bore into which said cylindrical member is to be fitted, the sealing device essentially comprising an annular endless resilient seal ring made of a resilient sheet-like material and having in its unmounted condition an inner diameter smaller than the outer diameter of a fitting portion on the cylindrical member, one of the opposite faces of said resilient seal ring being fitted around the fitting portion of the cylindrical member in a manner facing to the surface of the latter, while the other face of the resilient seal ring being located opposite to the sealing surface of the cylindrical bore and at least a part thereof being placed in resilient contact with the latter.

Since the resilient seal ring constructed in the above-described manner has no slit, excellent sealability is ensured along the whole periphery thereof. Further, since the seal ring can be easily made of a resilient sheet-like material and there is no necessity for machining work or the like, it is obtainable at a very low manufacturing cost.

Further, since the resilient seal ring has a high sealing force generated by self restoration, there is no necessity for any other auxiliary member.

Since the sealing device is constructed such that one of the opposite faces of the annular endless resilient ring made of a sheet material is located opposite to the bottom face of the piston ring groove and the inner peripheral part of the resilient seal ring constitutes an embracing portion for embracing the piston ring groove, while the outer peripheral part of the seal ring is projected outward beyond the piston ring groove and constitutes a seal lip portion adapted to come in resilient contact with the inner wall of the cylinder bore, a reliable unidirectional sealing is ensured along the whole periphery of the piston between both the high and low pressure chambers divided by means of the piston without any necessity for lathing, grinding or the like operation as is the case with the conventional resilient seal ring. Thus, the sealing device for fluidtightly sealing a clearance between a piston and a cylinder bore into which said piston is to be fitted can be manufactured at a substantially reduced cost.

The above and other objects and advantageous features of the present invention will be readily apparent from the reading of the following description of some preferred embodiments of the invention when taken in conjunction with the accompanying drawings.

DETAILED DESCRIPTION OF THE PREFERRED EMBODIMENTS

Now the present invention will be described in a greater detail with reference to the accompanying drawings which illustrate preferred embodiments of the invention.

Figure 1:
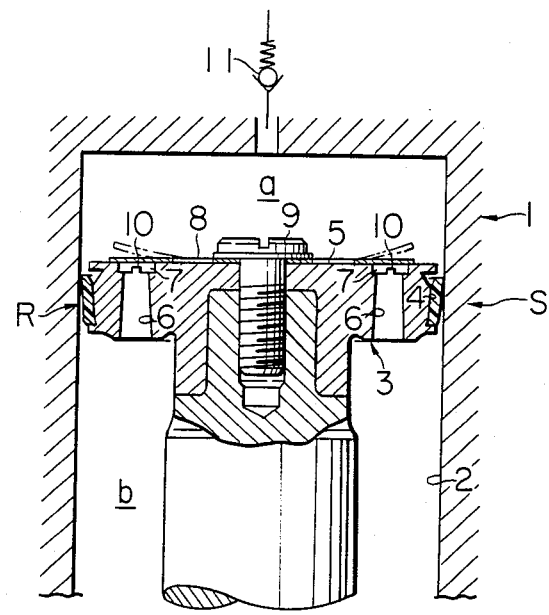
FIG. 1 is a partial vertical sectional view of a compressor with a sealing device in accordance with the present invention fitted thereto.
Figure 2:
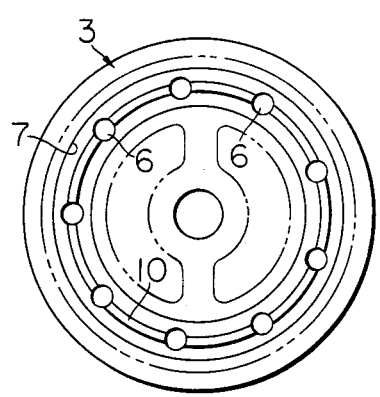
FIG. 2 is a plan view of a piston in the compressor in FIG. 1.

The illustrated embodiments are concerned with a case where the present invention is applied to a compressor. Referring to FIGS. 1 and 2, the compressor is constructed such that a piston 3 is slidably fitted into a cylinder bore 2 of a pump cylinder 1. Between the outer surface of the piston 3 and the inner wall of the cylinder bore 2 is disposed a sealing device S in accordance with the present invention which will be described later in more detail. Specifically, a resilient seal ring R is fitted around an annular piston ring groove 4 formed on the outer surface of the piston 3 in such a manner that a seal lip 1 around the peripheral edge of said resilient seal ring R comes in resilient contact with the inner wall of the cylinder bore 2.

The inner space in the cylinder bore 2 is divided into two chambers by means of the piston 3, one of the two chambers being an upper high pressure chamber, that is, a pumping chamber a and the other one being a lower low pressure chamber, that is, a fluid supply chamber b and the resilient seal ring R serves to prevent leakage of the fluid from the pumping chamber a into the fluid supply chamber b. The pumping chamber a is in communication with a certain compressed fluid consuming machine or apparatus (not shown) by way of a delivery valve 11. The piston 3 has a flat valve seat 5 on its upper end surface which faces toward the pumping chamber a. Further, the piston 3 has a plurality of suction ports 6 located at an equal distance on a circle and an annular communication groove 7 in communication with said suction ports 6 which are opened to the fluid supply chamber b. The annular communication groove 7 is opened to the pumping chamber a at the valve seat 5. It should be noted that the width of the communication groove 7 is dimensioned larger than the diameter of the respective suction ports 6. A flexible valve disc 8 having a thin thickness is fitted onto the valve seat 5 of the piston 3 by means of a stud bolt 9 so as to open or close the annular communication groove 7 by way of its resilient deformation in cooperation with the valve seat 5. Thus, the valve disc 8 constitutes a suction valve. On the bottom of the annular communication groove 7 are formed a plurality of band-shaped projections 10 which serve to limit an amount of deflection of the valve disc 8 toward the bottom of the annular communication groove 7, said band-shaped projections 10 being located between the adjacent suction ports 6 on the same circle as the aforesaid circle along which the suction ports 6 are disposed in an equally spaced relation.

It should be noted that the top face of the respective projections 10 is positioned a little bit below the valve seat 5 so as to cause no hindrance to seating activity of the valve disc 8 against the valve seat 5.

Figure 4:
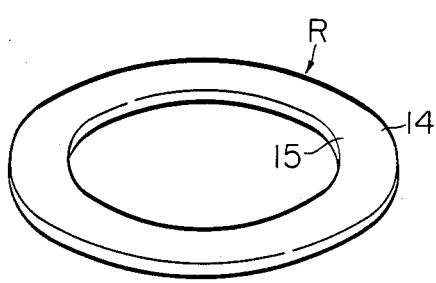
FIG. 4 is a perspective view of a resilient seal ring for the sealing device.

The resilient seal ring R to be fitted around the annular piston ring groove 4 on the piston 3 is prepared in the form of an endless ring as illustrated in FIG. 4 by a punching operation using a resilient blank which is produced in the form of a seat by way of a roll forming process. Fluoric resin is preferably used for the resilient blank, because it has an excellent corrosion resistance and wear resistance. However, the present invention should not be limited only to this but any suitable material may be employed when it is proven that it functions properly as a seal member. As mentioned above, the resilient seal ring R is fitted around the annular piston ring groove 4 on the outer surface of the piston 3 so as to seal a clearance between the outer surface of the piston 3 and the inner wall of the cylinder bore 2.

Figure 5B:
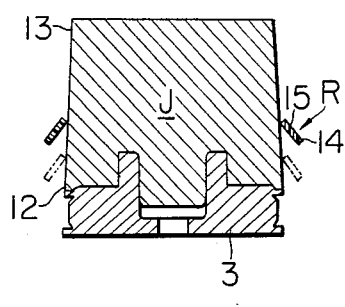
FIGS. 5A, 5B and 5C are respective sectional views of an inverted piston and a seal ring to be mounted on the piston, which are intended to illustrate the steps of fitting the resilient seal ring onto the piston.
Figure 5A:
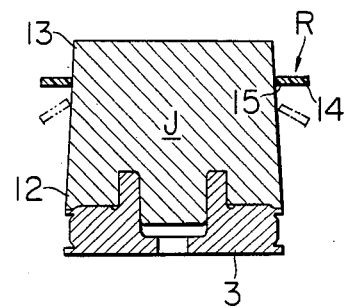
Figure 5C:
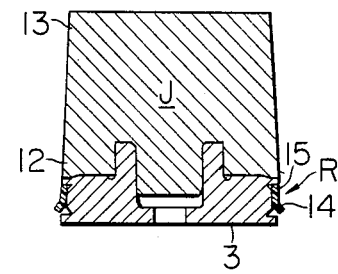

Next, the steps of fitting the seal ring around the annular groove on the piston will be described hereinbelow with reference to FIGS. 5A to 5C. First, the piston 3 is placed upside down and then a truncated conical fitting jig J is firmly mounted at its larger-diameter portion 12 on the bottom face of the piston 3. The larger diameter portion 12 of the fitting jig J has the same diameter as that of the piston 3 or an appreciably larger diameter than that of the latter. Next, the resilient seal ring R is fitted around the upper end part of the fitting jig J having a smaller diameter 13, as illustrated in FIG. 5A. Then, the seal ring R is displaced downward toward the lower end part of the fitting jig J having the larger diameter 12, while its outer peripheral part 14 is deformed at a downward inclination, as illustrated in FIGS. 5A and 5B. As it is further displaced downward, its inner diameter is gradually expanded with the outer peripheral part 14 bent toward the outer surface of the fitting jig J, until the inner peripheral part 15 is fitted around the one side of the annular piston ring groove 4 (upper side as seen in FIG. 5C) and the outer peripheral part 14 is fitted around the other side of the same (lower side as seen in FIG. 5C). Thus, the one face of the resilient seal ring R (lower face as seen in FIG. 4) is brought in contact against the bottom face 4a of the annular piston ring groove 4, as illustrated in FIG. 5C. Since the inner diameter of the resilient seal ring R is gradually expanded by means of the fitting jig J as described above, the inner peripheral part 15 embraces the one side of the annular piston ring groove 4 due to the self restorative force generated in the inward direction by the resiliency of the seal ring R whereby fluid-tightness is ensured between the bottom face 4a of the piston ring groove 4 and the inside face of the resilient seal ring R. Further, since the self restorative resilient force of the seal ring R is reduced gradually toward the outer peripheral part 14, it results that the latter is projected outward in the radial direction and its outermost peripheral edge constitutes a seal lip 1.

Figure 3:
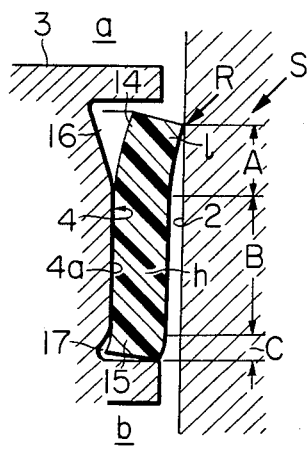
FIG. 3 is a partial sectional view of the piston in FIG. 2, shown in an enlarged scale.

FIG. 3 illustrates that the piston 3 with the resilient seal ring R fitted therearound in the normal posture is slidably fitted into the cylinder bore 2. As is apparent from the drawing, the outer peripheral part 14 of the resilient seal ring R is projected beyond the outer surface of the piston 3 (in area A in FIG. 3) and the seal lip 1 is constituted by the outermost peripheral edge of the former so that the seal lip 1 is brought in resilient contact against the inner wall of the cylinder bore 2 and ensures reliable sealing for preventing compressed fluid from leaking from the high pressure chamber, that is, the pumping chamber a, into the low pressure chamber, that is, the fluid supply chamber b. Further, the piston ring groove 4 is formed with an annular relief groove 16 at its one side (upper side as seen in FIG. 3), said annular relief groove 16 being located opposite to the rear portion of the outer peripheral part 14 of the resilient seal ring R and having a depth larger than that of the bottom face 4a of piston ring groove 4. The relief groove 16 allows the seal lip 1 to be freely deformed in the radial direction, resulting in an improved followability thereof relative to the inner wall of the cylinder bore 2. Further, the resilient seal ring R has an inwardly directed embracing force in the central area (in area B in FIG. 3) generated due to the self restorative force so as to constitute an embracing section h relative to the bottom face 4a of the piston ring groove 4, said embracing force being increased gradually toward the inner peripheral part 15 of the resilient seal ring R, whereby an excellently high sealability is ensured with the resilient seal ring R firmly held around the annular piston ring groove 4.

The piston ring groove 4 is additionally formed with an annular groove 17 at its other side (lower side as seen in FIG. 3), said annular groove 17 being located opposite to the rear side of the inner peripheral part 15 of the resilient seal ring R and having a depth more than that of the piston ring R, so that the innermost peripheral edge of the inner peripheral part 15 of the resilient seal ring R (in area C in FIG. 3) is engaged to the annular groove 17. As a result the embracing section h of the resilient seal ring R has an increased embracing force exerted on the bottom face 4a of the annular piston ring groove 4 and at the same time inhibits idle displacement of the seal ring R (in the vertical direction as seen in FIG. 3).

Next, operation of the sealing device in accordance with the illustrated embodiment of the present invention will be described below.

As the piston 3 effects downward movement from the position as illustrated in FIG. 1, the delivery valve 11 is caused to close and thereby pressure in the pumping chamber a is reduced so that the valve disc 8 is deformed upward as illustrated by broken lines in FIG. 1 and thereby the communication groove 7 is opened, causing fluid in the fluid supply chamber b to be sucked into the pumping chamber a. Next, as the piston 3 effects upward movement, fluid in the pumping chamber a is compressed and the valve disc 8 is depressed by increased pressure of compressed fluid until it comes in contact with the valve seat 5 to close the communication groove 7. The compressed fluid is then delivered to a certain compressed fluid consuming machine or apparatus by opening the delivery valve 11.

The pumping chamber a has an increased pressure during the upward stroke of the piston 3 and thereby the seal lip l in the outer peripheral part 14 of the resilient seal ring R comes in resilient contact with the inner wall of the cylinder bore 2 so as to ensure fluid-tightness. Further, the embracing section h in the inner peripheral part 15 of the resilient seal ring R is embraced around the bottom face 4a of the annular piston ring groove 4 by the embracing force generated due to self-restoration of the seal ring R and thereby fluidtightness is ensured between the inner wall of the seal ring R and the bottom face 4a of the piston ring groove 4 so that any leakage of fluid from the pumping chamber a, that is, the high pressure chamber, into the fluid supply chamber b, that is, the low pressure chamber, is completely prevented. Since the embracing force of the resilient seal ring R is much larger than an expansion force caused by heating it, said expansion force being directed outward in the radial direction, there is no fear that the aforesaid sealability is impaired even when the resilient seal ring R is heated.

Figure 6:
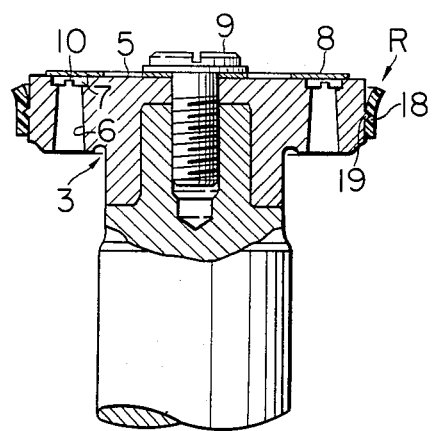
FIG. 6 is a partial sectional view of a piston with a modified resilient seal ring fitted thereto.

Next, FIG. 6 illustrates a sealing device in accordance with a modified embodiment of the present invention where the resilient seal ring R is fitted onto the piston 3 in a different manner from the preceding embodiment. This modified embodiment of the present invention consists in that an annular engagement groove 18 is provided on either of the upper or lower face of the resilient seal ring R and a corresponding engagement projection 19 is formed at a certain position on the outer surface of the piston 3 where said projection 19 on the piston 3 is fitted into said engagement groove 18 on the seal ring R. It should be noted that a manner of fitting the former into the latter is quite the same as that in the foregoing embodiment.

The present invention has been described above with reference to the preferred embodiments where the sealing device is utilized to sealably fill a clearance between the piston and the cylinder bore in a compressor but it should be of course understood that the present invention should not be limited to them and it may be applied to any other machine or apparatus which include a cylindrical member and a cylinderical bore with a certain clearance formed therebetween.

What is claimed is:

1. A sealing device for ensuring fluid tightness between a piston having an annular piston ring groove on its outer surface and a cylinder into which said piston is slidably fitted, wherein the sealing device essentially comprises an annular endless resilient seal ring made of a resilient sheet-like material and having in its unmounted condition an inner diameter smaller than the outer diameter of said annular piston ring groove, one of the opposite surfaces of said resilient seal ring being fitted is said piston ring groove in a facing manner with respect to the bottom surface of the groove, the inner peripheral part of the resilient seal ring constituting an embracing portion adapted to embrace the piston ring groove while the outer peripheral part of the same is projected outward beyond the outer surface of said piston in its mounted position and constitutes a seal lip in resilient contact with the inner wall of the cylinder bore, and said piston ring groove is formed with an annular relief groove at one end thereof opposite to the rear face of said outer peripheral part of said seal ring, said relief groove having a depth larger than that of said piston ring groove, for allowing free deformation of said seal lip in the radial direction, said piston ring groove being further formed with an annular engagement groove at the other end thereof having a depth thereof larger than that of said ring groove and receiving an innermost peripheral edge of the inner peripheral part of said resilient seal ring.

2. A sealing device as claimed in claim 1 wherein said piston is loosely fitted in said cylinder and said seal ring is placed in contact with the inner wall of said cylinder bore only at said seal lip thereof.

* * * * *